(12) United States Patent
Inman et al.

(10) Patent No.: US 6,886,312 B1
(45) Date of Patent: May 3, 2005

(54) COMPACTING ROTOR FOR BAGGING MACHINES

(75) Inventors: Larry Inman, Astoria, OR (US);
Walter Jay, Tekamah, NE (US);
Jeremy Linder, Astoria, OR (US)

(73) Assignee: Miller-St. Nazianz, Inc., St. Nazianz, WI (US)

( * ) Notice: Subject to any disclaimer, the term of this patent is extended or adjusted under 35 U.S.C. 154(b) by 0 days.

(21) Appl. No.: 10/704,104

(22) Filed: Nov. 7, 2003

(51) Int. Cl.$^7$ ............................................. B65B 63/02
(52) U.S. Cl. ........................... 53/527; 53/529; 100/144
(58) Field of Search ........................ 53/436, 438, 527, 53/529; 56/341, 504, 231, 156, 14.5; 83/664, 665, 698.41; 100/65, 144; 141/114

(56) References Cited

U.S. PATENT DOCUMENTS

| | | |
|---|---|---|
| 1,717,759 A | 6/1929 | Briggs |
| 4,046,068 A | 9/1977 | Eggenmuller |
| 4,256,031 A | 3/1981 | Ryan |
| 4,308,901 A | 1/1982 | Lee |
| 4,310,036 A | 1/1982 | Rasmussen |
| 4,337,805 A | 7/1982 | Johnson |
| 4,502,378 A * | 3/1985 | Cullen ........................ 100/65 |
| 4,621,666 A | 11/1986 | Ryan |
| 4,688,480 A | 8/1987 | Ryan |
| 4,724,762 A | 2/1988 | Jeschke |
| 4,724,876 A * | 2/1988 | Ryan ........................ 100/144 |
| 4,907,503 A * | 3/1990 | Ryan ........................ 100/144 |
| 4,949,633 A | 8/1990 | Johnson |
| 4,982,907 A * | 1/1991 | Sedgwick et al. ............ 83/664 |
| 5,159,877 A | 11/1992 | Inman |
| 5,503,066 A | 4/1996 | Koskela |
| 5,519,990 A * | 5/1996 | Rodewald et al. ............ 56/341 |
| 5,630,476 A * | 5/1997 | Foster et al. ................. 171/63 |
| 5,680,999 A * | 10/1997 | Wada ........................ 83/664 |
| 5,878,552 A * | 3/1999 | Wingert ..................... 53/438 |
| 6,012,271 A * | 1/2000 | Wilkens et al. ............... 56/341 |
| 6,158,320 A * | 12/2000 | Vallance et al. ............. 83/665 |
| 6,298,646 B1 * | 10/2001 | Schrag et al. ................ 56/341 |
| 6,516,586 B1 * | 2/2003 | Wingert ..................... 53/438 |
| 6,581,364 B2 * | 6/2003 | Lucand et al. ................ 56/341 |
| 6,595,123 B2 * | 7/2003 | Schrag et al. ............... 56/14.5 |
| 6,644,006 B1 * | 11/2003 | Merritt et al. ................ 56/341 |
| 6,651,418 B1 * | 11/2003 | McClure et al. ............. 56/341 |
| 6,672,034 B1 * | 1/2004 | Wingert ..................... 53/436 |
| 6,679,040 B2 * | 1/2004 | Lucand et al. ................ 56/341 |

* cited by examiner

*Primary Examiner*—Louis Huynh
(74) *Attorney, Agent, or Firm*—Whyte Hirschboeck Dudek SC

(57) ABSTRACT

A rotor for a bagging machine used to force feed material, e.g., silage, for compaction in a tunnel of the machine prior to insertion of the material into a large storage bag. The rotor includes teeth sets closely spaced along the length of the rotor and each teeth set including at least three circumferentially spaced teeth. Preferably the teeth of each teeth set are intregal with a support or base ring that slidably fits en elongate pipe or tube and position axially in circumferentially as desired and then weld tacked to the pipe.

5 Claims, 5 Drawing Sheets

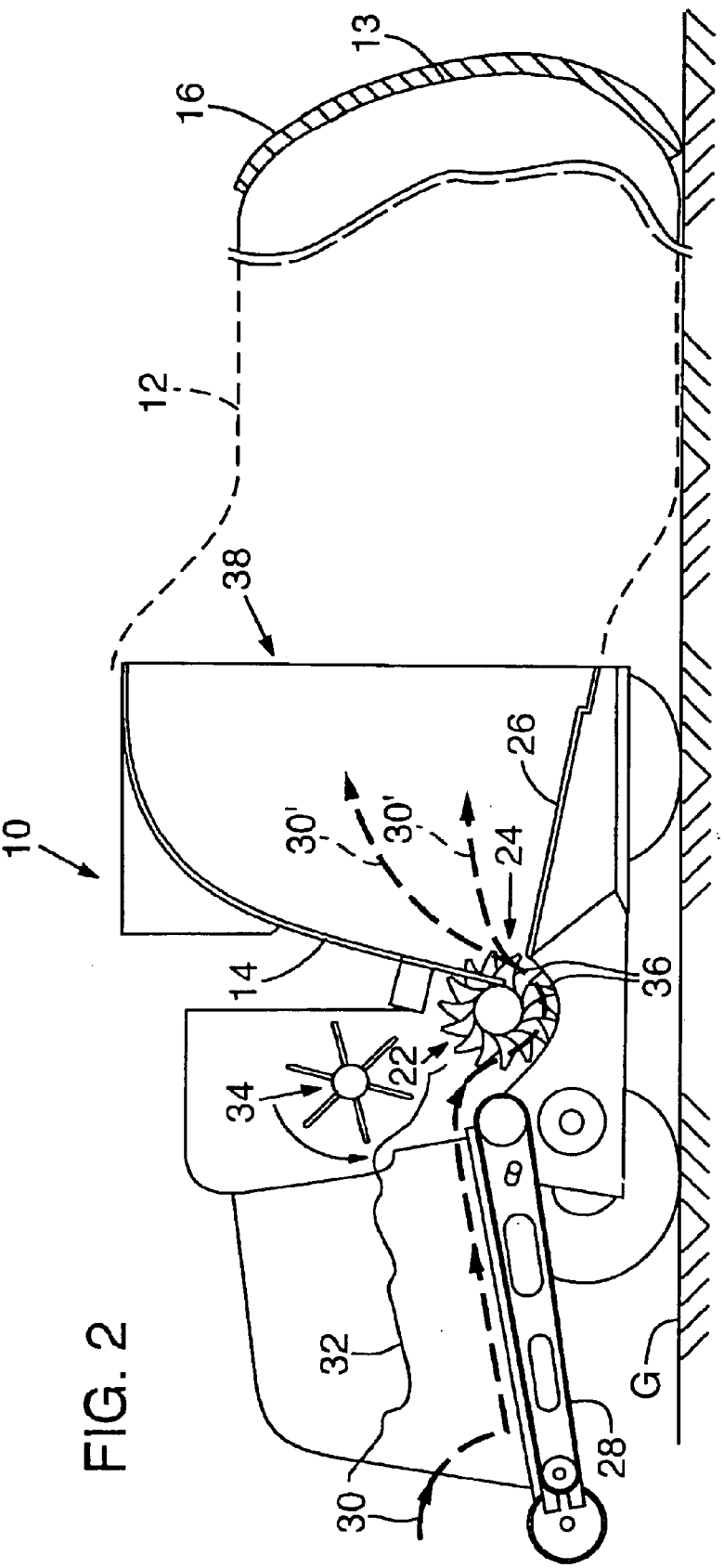

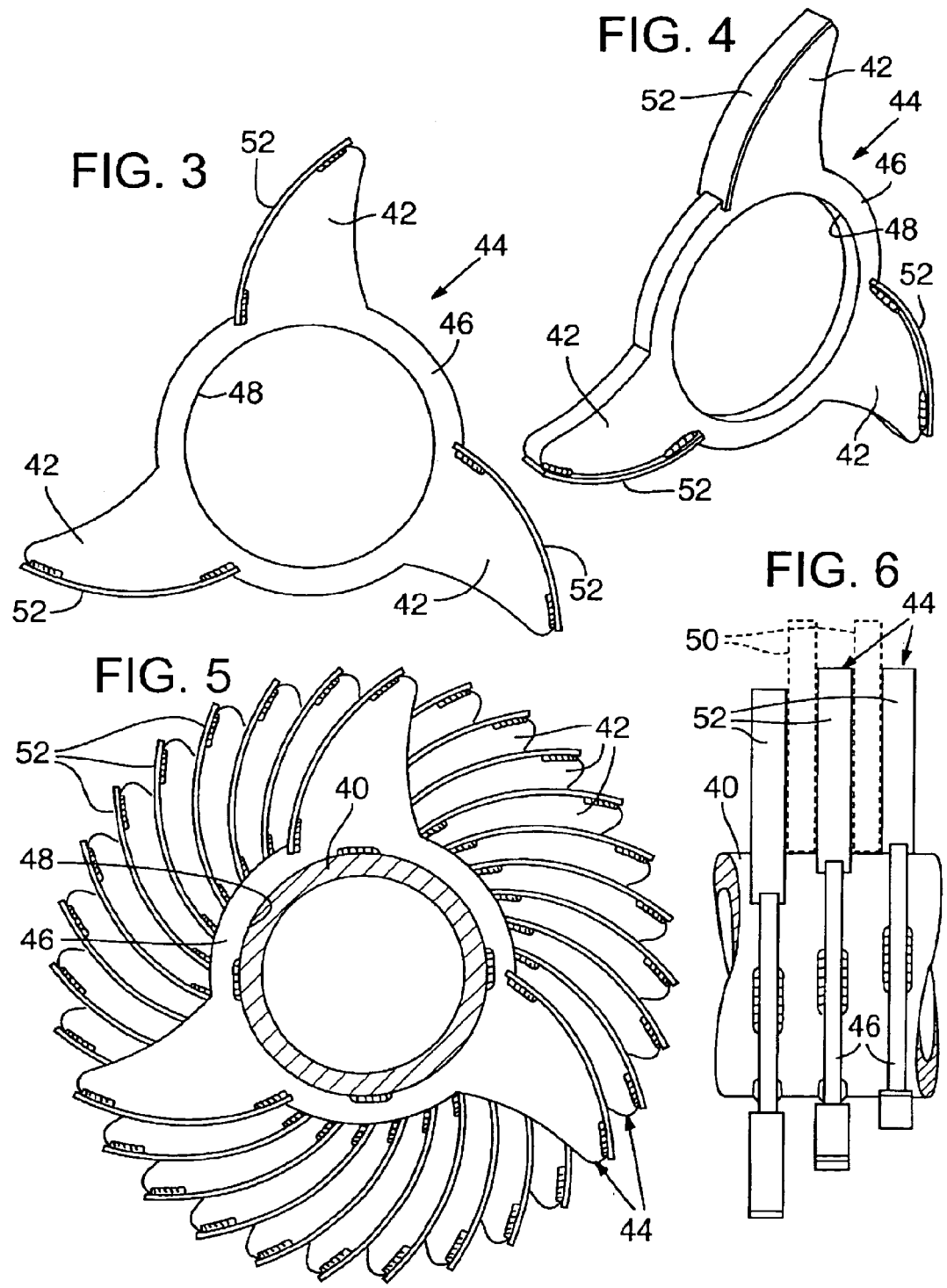

COMPACTING ROTOR FOR BAGGING MACHINES

FIELD OF INVENTION

This invention relates to that component of a bagging machine that forcibly moves material to be bagged, e.g. silage, from a receiving bin or conveyor into the machine tunnel wherein the material is compacted prior to being inserted into a bag.

BACKGROUND OF THE INVENTION

It is desirable to maximize the compaction of material, e.g. silage, stored in a storage bag to more effectively utilize the capacity of the bag and to dispel air/oxygen that enhances undesired spoilage of the bagged material. Such compaction is achieved by a compacting rotor that is mounted at a restricted inlet of the machine's tunnel. The rotor is a cylinder or pipe that has teeth mounted on the pipe surface in a prescribed pattern. Material is directed toward the inlet and the teeth of the rotor grab the material and force it rearward through the inlet and into the tunnel and toward the tunnel outlet. The outlet of the tunnel (inlet to the bag) is effectively blocked (material movement is resisted) until a sufficient force is applied. The material is accordingly compacted in the tunnel until the rearward thrust imparted by the rotor overcomes the resistance, moves the machine forward to deploy an incremental length of the bag, and the compacted material is thereby moved into the bag.

The bag is sized to fit the cross section of the tunnel and theoretically the material is moved as a compacted cylindrically shaped continuous block of the material that slides into the bag and fills the bag to its capacity. In actual experience, for any of a variety of reasons, the bag is not filled to capacity. Further, it has been learned that certain sizes of the bags, e.g., smaller sizes, will fill to capacity more effectively than the larger sizes. Whereas the rotors have been increased in size and power and speed to accommodate the larger machines for filling the larger bags, the non-capacity filling for the larger bags has persisted and a different answer to the problem was needed.

BRIEF DESCRIPTION OF THE INVENTION

The present invention is directed to the above mentioned prescribed pattern of the teeth. The teeth are presently secured to a steel pipe having a length of about 90 inches and spans the width of the inlet to the tunnel. The teeth are spaced along the pipe at one-inch intervals and each position has a pair of opposing teeth, i.e., 180 degrees apart. Sequentially, each subsequent pair of teeth are offset circumferentially by about 12 degrees. A more complete explanation of one type of rotor arrangement is explained in the commonly owned U.S. Pat. No. 5,159,877, the disclosure of which is incorporated herein by reference.

The material that is commonly bagged is silage which is moist and congeals into clumps of material. Feeder bars overlying the inlet rotate to break up the clumps in part. Nevertheless, there remains at least smaller congealed masses of material that are fed into the rotor which further breaks up these masses, i.e., clumps, as they are engaged by the rotor teeth.

It is theorized that the material that is passed through the inlet and into the tunnel for compaction nevertheless still remains at least partially in smaller clumps/masses of material. It is further theorized that these clumps, when compacted together, nevertheless result in spaces interposed between the clumps. For the larger machines, these spaces are larger and when inserted into the bag, followed by settling of the material, the material volume becomes undersized for the available capacity of the bag.

The solution of the present invention is to reduce the spaces between the rotor teeth to thereby further restrict the openings through which material is conveyed through the inlet, thus further reducing the size of the clumps being conveyed and thereby enabling greater compaction in the tunnel and as inserted into the bag. This is accomplished in the preferred embodiment by adding a tooth at each of the positions along the rotor length, i.e., three teeth at 120 degree intervals rather than two teeth at 180 degree intervals.

A rotor having the three teeth per position arrangement has been built and tested and indeed the compaction of the material as placed in the bag is improved.

A further improvement of the invention is in the manufacture of the rotor. Whereas the prior two teeth arrangement involved the fabrication of individual teeth that were then each tacked (by welding) to the outer surface of the pipe, the three tooth arrangement is formed as a single component, i.e., a ring having radial teeth that slide as a unit along the pipe circumference. Thus, a ring and the three teeth arrangement are cut from a single plate. The ring is slid into position on the pipe and a single welding tack may be applied to secure the three teeth in the desired location.

The invention will be more clearly understood and appreciated upon reference to the following detailed description and the drawings referred to therein.

DESCRIPTION OF THE FIGURES

FIG. 2 is a schematic side view of the machine of FIG. 1 illustrating the manner by which the feed rotor feeds and compacts the material being bagged;

FIG. 3 is a side view of a three-tooth segment as applied to the feed rotor of FIG. 1;

FIG. 4 is a perspective view of the three-teeth segment of FIG. 3;

FIG. 5 is an end view of the feed rotor of FIG. 1;

FIG. 6 is a partial side view of the feed rotor of FIG. 5; and

DESCRIPTION OF THE PREFERRED EMBODIMENT

Figure 1:
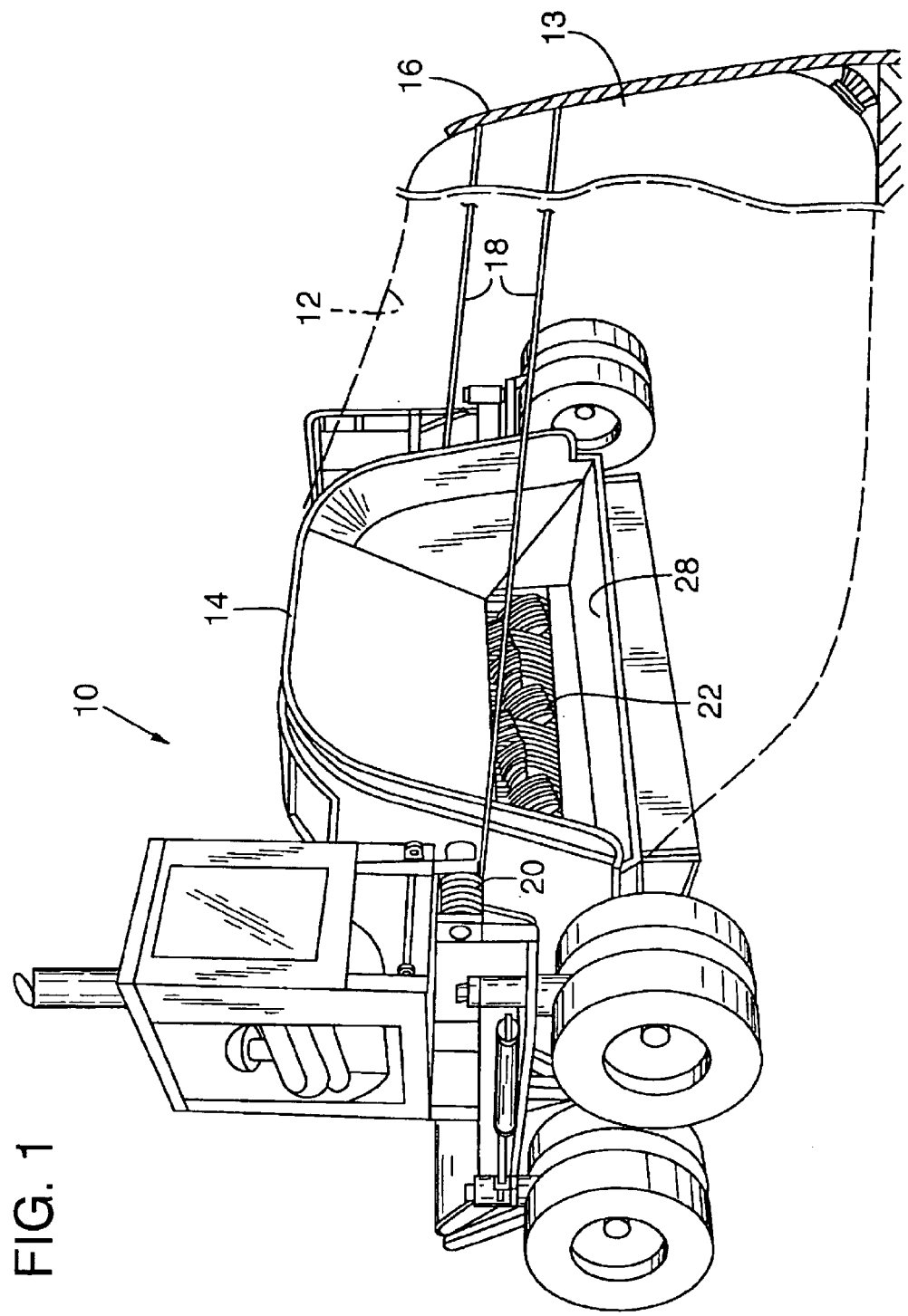
FIG. 1 illustrates a bagging machine incorporating a feed rotor of the present invention.

FIGS. 1 and 2 illustrate a bagging machine 10 as is typical of bagging machines used to fill a large flexible bag shown in phantom and indicated by reference number 12. Such bags 12 are mounted in folded condition (accordion-type fold) to the exterior of the tunnel 14 and is deployed incrementally as material is force-fed into the bag. As seen in FIG. 1, a backstop 16 is secured by cables 18 to cable drums 20 on machine 10 and the cables are resistively reeled out (resisted by a brake mechanism) to permit deployment of the bag. Pressure to overcome the brake resistance is applied by the closed end 13 of the bag being forced outwardly as material is fed into the bag which will now be explained.

A feed rotor 22 is shown in both FIGS. 1 and 2, but the reader is particularly referred to the schematic side view illustration of FIG. 2. As illustrated in FIG. 2, a restricted inlet 24 is defined by the back-lower end of tunnel 14 and the tunnel floor 26. The feed rotor 22 is positioned adjacent to the inlet and is rotated to grab and direct material being fed by conveyor 28 toward the feed rotor as indicated by directional arrows 30, and from the feed rotor through the inlet 24 and into the tunnel 14 as indicated by arrows 30'.

In operation, material to be bagged (reference 32) is moved by e.g., the conveyor 28, which first engages beater bars 34 and is then directed into the teeth 36. The teeth 36 rotate (counter-clockwise as seen in FIG. 2) to force-feed the material through the inlet 24 and into the tunnel 14. The bag end 13 and backstop 16 is initially adjacent the end opening 38 and material 32 is fed into the tunnel and against the bag end 13 and backstop 16. The bag end 13 is prevented from pushing away from the opening 38 by the cables 18. The material fills the tunnel 14 to a compacted state and continued rotation of the rotor 22 generates a reverse force against the tunnel until sufficient pressure is applied to the backstop 16 to overcome the brake resistance of cable drums 20 (see FIG. 1). At that point the cable drum releases additional cable 18 and the machine 10 moves away from the backstop and such produces incremental deployment of bag 12 from the tunnel 14. Accordingly, material 22 in the tunnel 14 is incrementally moved through the end opening 38 and into the bag 12.

Whereas the above procedure theoretically produces compaction of the material, first in the tunnel and then in the bag to fill the bag (the bag being sized according to the tunnel size) whereby the bag should closely confine the material and alleviate bag slack and the presence of air. Experience has revealed, however, that the material settles and undesired bag slack does occur, particularly in the larger sizes of bags, e.g., 10 to 16 feet in diameter.

Whereas the bag's slack has been largely accepted as unavoidable for the larger sized bags, e.g., of silage material, it has not been accepted as satisfactory. In the course of trying a variety of modifications, a change to the feed rotor unexpectedly has resulted in a desirable improvement to compaction which is now explained.

As will be noted from FIGS. 1, 2, 5 and 6 (and as explained in the above noted '877 patent), the feed rotor 22 is comprised of a center pipe 40 to which is affixed a pattern of radially extended teeth 42. The teeth are provided as individual segments 44 as best seen in FIGS. 3 and 4. Each segment is a base ring 46 with teeth 42 intregal with and radially extended from the ring 46. The inner diameter of the center opening 48 matches the outer diameter of the pipe 40 (FIG. 5) and thus the ring 46 can be slid onto the pipe from one end and positioned both axially and circumferentially as desired. Many such segments 44 are mounted to the pipe and welded into place.

It is desirable to offset adjacent segments circumferentially to form a pattern of teeth whereby the engagement with the material is essentially continuous while feeding incremental portions of the materials into and through the inlet 24. As known to the industry and as illustrated in FIG. 6, fixed stripper bars 50 (shown in dash line) are positioned above the inlet 24 and fit between the teeth 42 to strip away material that is carried up and back over the rotor.

From FIGS. 3–5, it will be noted that each segment 44 carries three equally spaced teeth 42. The leading edge of each tooth is provided with a wear strip 52 which can be replaced as needed. As seen in FIG. 6, the spacing between the segments 44 is about equal to the teeth width, e.g., one inch.

The rotor of the invention as provided with a three-teeth arrangement, even when slowed as compared to the prior two-teeth arrangement, produces a faster fill rate with less power. More importantly, the three-teeth arrangement provides better compaction of the material in the tunnel and thus in the bag. This result is not fully understood but is believed to be generated by the reduced size of the pocket that is formed between the segments. Each tooth, in conjunction with the side walls of adjacent teeth, acts like a fast-moving bucket that engages and tears away a portion of the material. These are smaller buckets than previously, due to the closer spacing circumferentially, but there are more of them and material is fed into the tunnel as rapidly or even more rapidly but as smaller clumps. The smaller clumps compact in the tunnel with reduced interstices that otherwise form when compacting the larger clumps. Thus, there is less settling and less bag slack and higher percentage of material per bag capacity.

Figure 7:
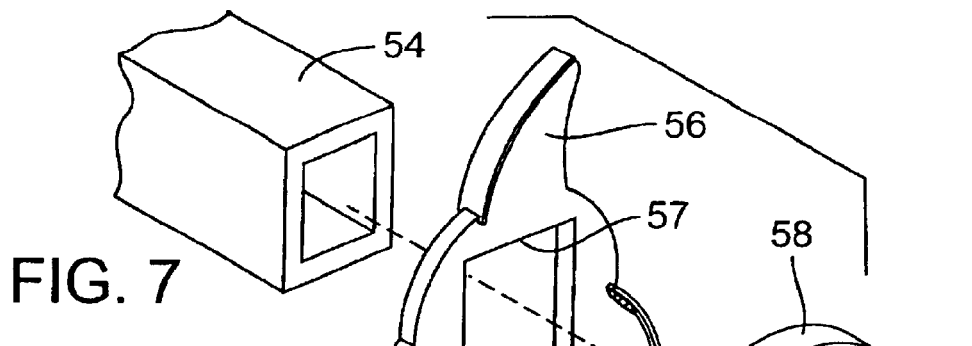
FIGS. 7–10 illustrate variations to the mounting of teeth to a rotor.
Figure 8:
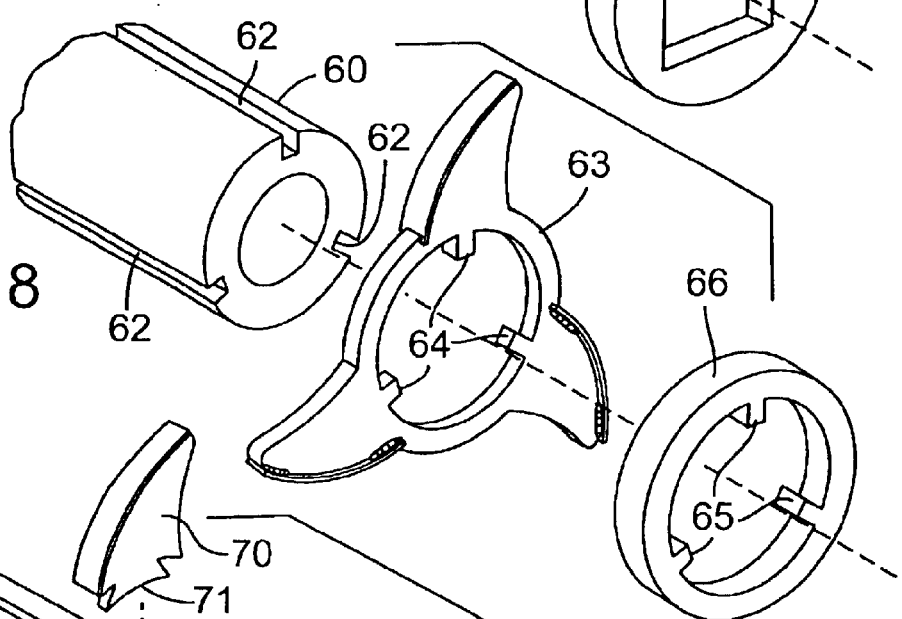
Figure 9:
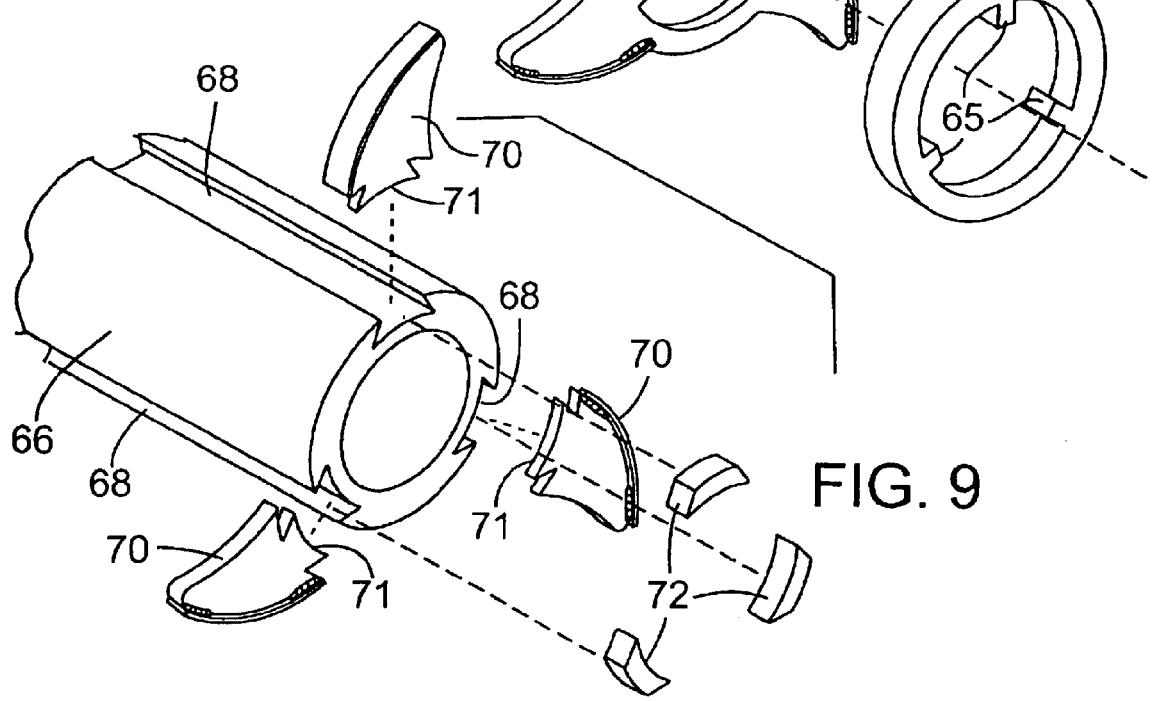

FIGS. 7–9 illustrate variations in the manner of securement of the teeth segments to the rotor pipe. In FIG. 7, the pipe 54 is square shaped and a square shaped opening 57 of teeth segment 56 allows the teeth segment to be fixed circumferentially relative to the rotor pipe without spot welding. The teeth may be separated by a spacer 58. FIG. 8 is a further variation with grooves 62 formed in a cylindrical pipe 60 and the teeth segment 63 and spacer 66 provided with tabs 64 and 65 respectively that fit the groove 66 which permit relative sliding and not rotative sliding of the segments on the pipe. FIG. 8 illustrates a trapezoidal slot 68 formed in shaft 66 with segment 70 having tangs 21 that fit the slot. Spacers 72 are similarly configured.

Figure 10:
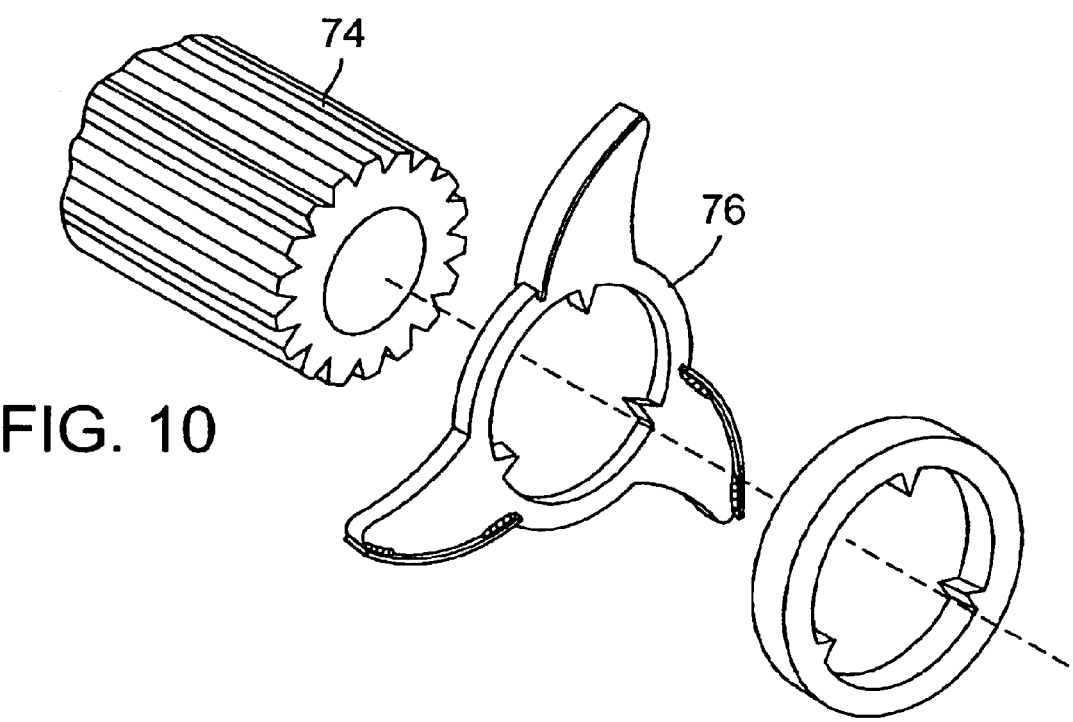

In all these cases, the shafts 54, 60,66 may be twisted (or the grooves 62, 68 twisted relative to the shaft) to achieve the desired circumferential offset of adjacent teeth sets. Alternatively, the teeth sets may be varied as to the circumferential location of the opening 57, tab 64 or tang 71 relative to the teeth. A further embodiment is illustrated in FIG. 10 wherein the pipe or shaft is provided with closely spaced grooves and the teeth segment 76 has widely spaced apart groove fitting teeth that permit adjustment of the segment 76 rotatively relative to each other.

Those in the art will conceive of modifications and variations as compared to the disclosed embodiment herein. The claims are not limited to the enclosed embodiment but include all such modifications and variations that are encompassed by a broad interpretation of the claims appended hereto.

What is claimed is:

1. A bagging machine for conveying crop material to be bagged for storage in large plastic bags wherein the material is compacted to fill the bag and reduce the presence of ar in the bag, said bagging machine comprising:

a tunnel portion having an inlet and an outlet, a compacting rotor positioned at the inlet, and a conveyor for conveying crop material to the rotor at the inlet;

said compacting rotor receiving the crop material of the conveyor and force feeding the crop material through the inlet and into the tunnel portion;

said outlet adapted to receive a bag, and including mechanism in cooperation with the bag to resistively permit flow of the crop material through the outlet and into the bag;

said rotor including:

a pipe having a circumference and an axial length, a plurality of teeth sets affixed to the pipe's circumference and spaced incrementally along the axial length of the pipe and protruding radially from the circumference, said teeth sets in combination defining a pattern for cooperative grabbing and force feeding of material through the tunnel inlet;

each teeth set comprised of at least three teeth in circumferential alignment and, positioned symmetrically around the circumference of the pipe, and adjacent teeth sets circumferentially offset from each other whereby the congealing material is reduced in size as determined by the spaces between the teeth sets and between the teeth of the teeth sets to enhance compaction of the material in the tunnel prior to bagging.

2. The bagging machine of claim 1 wherein the teeth sets are spaced apart in increments of about one inch and the adjacent teeth sets are offset circumferentially between about 10 and 15 degrees.

3. The bagging machine of claim 2 wherein the teeth sets are integrally formed as a teeth set ring having a center opening slidable axially onto and along said pipe circumference.

4. The bagging machine of claim 3 wherein the pipe is cylindrical and the ring opening mated to the pipe's circumference for slidable positioning thereon, both axially and circumferentially, whereat the position is fixed by tack welding.

5. The bagging machine of claim 3 wherein the pipe is non-cylindrical and the ring opening is mated to the pipe shape and slidable axially thereon and non-slidable circumferentially thereon.

* * * * *